J. A. GUSTAFSON.
MINER'S ACETYLENE GAS LAMP.
APPLICATION FILED AUG. 29, 1914.
1,142,699.
Patented June 8, 1915.
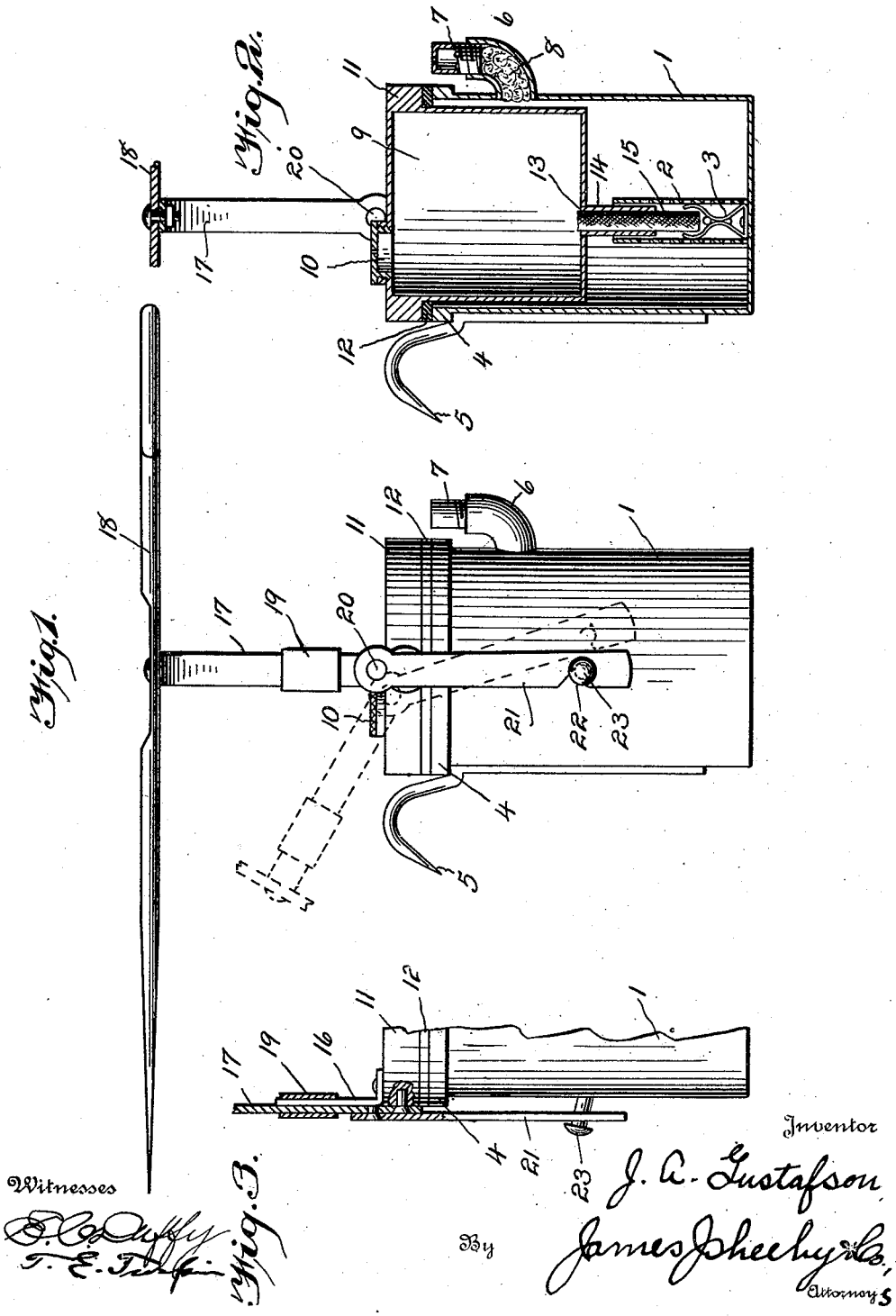

UNITED STATES PATENT OFFICE.

JUSTUS A. GUSTAFSON, OF IDAHO SPRINGS, COLORADO.

MINER'S ACETYLENE-GAS LAMP.

1,142,699. Specification of Letters Patent. Patented June 8, 1915.

Application filed August 29, 1914. Serial No. 859,259.

*To all whom it may concern:*

Be it known that I, JUSTUS A. GUSTAFSON, citizen of the United States, residing at Idaho Springs, in the county of Clear Creek and State of Colorado, have invented new and useful Improvements in Miners' Acetylene-Gas Lamps, of which the following is a specification.

My present invention pertains to miners' lamps; and it contemplates the provision of a simple, compact and reliable acetylene gas lamp, constructed and equipped with a view to being conveniently used by miners.

The invention in all of its details will be fully understood from the following description and claims when the same are read in connection with the drawings, accompanying and forming part of this specification, in which:

Figure 1 is a side elevation showing my novel lamp in readiness for use, and also showing by dotted lines the position to which the bail is swung to bring about disengagement of the links from the projections on the generating tank. Fig. 2 is a detail vertical, diametrical section taken in a plane parallel to Fig. 1. Fig. 3 is a detail view, partly in elevation and partly in section, showing the manner in which the adjustable sleeve on the bail coöperates with the upright on the cover to lock the cover on the generating tank.

Similar numerals of reference designate corresponding parts in all of the views of the drawings.

The generating tank 1 of my novel lamp is provided interiorly with a foraminous tube 2, which is removably held in position by a spring 3, fixed to and rising from the bottom of the tank. At its upper edge said tank is preferably flanged as indicated by 4, and exteriorly it is provided with the conventional hook 5 and a burner tube 6, equipped with an apertured tube 7. By preference the tube 6 is charged with cotton 8 designed to remove impurities from the gas precedent to the consumption thereof.

Removably arranged in the tank 1 is a combined cover and water receptacle 9. Said receptacle is provided with a normally closed filling aperture 10 and an exterior flange 11, and at the underside of the latter is a gasket 12, designed and adapted to hermetically seal the tank 1. In its bottom the receptacle 9 is provided with a discharge aperture 13 surrounded by a depending tube 14, snugly occupied by a wick 15 which has for its purpose to retard the flow of water into the tube 2 and from thence into the tank 1. Fixed to the cover or combined cover and upright and arranged adjacent the edge thereof is an upright 16. Pivoted at diametrically opposite points to the upper part of the water receptacle and cover is a bail 17, on which is pivoted the usual prong 18, and adjustable vertically on one side portion of the said bail is a sleeve 19.

Pivotally connected at 20 to the end portions of the bail 17 and off the center of movement of said bail are links 21. These links 21 have inclined notches 22, designed to receive lateral and headed projections 23 on the tank 1; the said projections 23 being preferably inclined as shown with a view to facilitating engagement of the notched links thereto.

In the practical use of my novel lamp, the tank 1 is charged with calcium carbid, and the combined cover and receptacle 9 is filled to the extent desired with water. The receptacle is then placed in the tank with the parts relatively arranged as shown in Fig. 1, after which the links are swung into engagement with the projections 23, and the bail 17 is arranged in vertical alinement with the links, and the sleeve 19 is adjusted down so as to surround the upright 16. With this done the combined cover and receptacle 9 will be hermetically sealed on the tank 1 to prevent the escape of gas from the latter except through the tip 7. It will also be noted that the gasket 12 will be compressed against the tank, and that there is absolutely no liability of the combined cover and receptacle being released from the tank 1. When however, it is desired to remove the combined cover and receptacle, the same can be expeditiously and easily effected after the sleeve 19 is moved upwardly off the upright 16, and the bail 17 and links 21 are swung to the positions shown by dotted lines in Fig. 1.

Having described my invention, what I claim and desire to secure by Letters-Patent, is:

1. In means for the purpose described, the combination with a tank, of a cover removably arranged on the tank, an upright fixed to the cover, a bail pivoted to the cover, an adjustable sleeve movable on the bail and on and off said upright, and coöperating means on the tank and the bail for locking the cover on the tank when the bail is secured by the sleeve to the upright.

2. In means for the purpose described, the combination of a tank having lateral projections, a cover removably arranged on the tank and having an upright, a bail pivotally connected to the cover, a sleeve adjustable on the bail and on and off the upright, and links pivotally connected to the bail and notched for engagement with the projections of the tank.

In testimony whereof I have hereunto set my hand in presence of two subscribing witnesses.

JUSTUS A. GUSTAFSON.

Witnesses:
FRANK SMITH,
GEO. A. DUMONT.

Copies of this patent may be obtained for five cents each, by addressing the "Commissioner of Patents, Washington, D. C."